United States Patent [19]
Neumann et al.

[11] 3,856,901
[45] Dec. 24, 1974

[54] VAPOR INDUCTION SYSTEM

[75] Inventors: James W. Neumann; Douglas L. Yielding, both of Port Huron, Mich.

[73] Assignee: TVI marketing Inc., Lexington, Mich. ; by said Newman

[22] Filed: Oct. 25, 1972

[21] Appl. No.: 300,579

[52] U.S. Cl. .............................. 261/18 A, 123/25 R
[51] Int. Cl. ............................................ F02m 25/02
[58] Field of Search......... 261/18 A, 1 A; 123/25 R, 123/25 L

[56] References Cited
UNITED STATES PATENTS

| | | | |
|---|---|---|---|
| 1,755,056 | 4/1930 | De Weese | 261/18 A |
| 2,692,585 | 10/1954 | Dunnigan | 261/18 A |
| 2,731,250 | 1/1956 | Yon | 261/18 A |
| 3,050,044 | 8/1962 | Anderson | 261/18 A |
| 3,172,348 | 3/1965 | Berg | 123/136 |
| 3,450,116 | 6/1969 | Knight et al. | 123/25 H |
| 3,528,225 | 9/1970 | Manfredi | 123/25 R |
| 3,537,434 | 11/1970 | Herpin | 123/25 L |
| 3,641,769 | 2/1972 | Vizza | 123/25 B |
| 3,749,376 | 7/1973 | Alm et al. | 261/18 A |

Primary Examiner—Tim R. Miles
Attorney, Agent, or Firm—Dale A. Winnie

[57] ABSTRACT

A catalitic fluid vapor induction system for use with internal combustion engines and including a container for a catalitic fluid with a closure member having a fresh air inlet and a vapor mist outlet provided therethrough, an air inlet tube connected to the fresh air inlet and extended below the liquid level in the container, a connection between the vapor mist outlet and the induction system of an engine for inducing air flow through the tube and out the lower end thereof for bubbling to the surface, and a metering valve assembly in the engine connecting line for regulating the extent of the bubbling and the vapor mist created thereby for induction to the engine.

2 Claims, 3 Drawing Figures

VAPOR INDUCTION SYSTEM

BACKGROUND OF THE INVENTION

Efforts are continuously being made to obtain more complete burning of the fuels used in internal combustion engines to imporove their performance and efficiency and to reduce the exhaust emission level which is known to add polution to the atmosphere.

Among the different methods that have been tried is the addition of a catalist or catalitic fluid into the fuel or into the fuel induction system. However, either the rate of consumption of such additives or the cost of the devices to meter their flow, and obtain jet sprays, has proven prohibitive.

Although use of the engine vacuum to induce a metered flow of a fluid additive into the engines induction system has also been tried, the problem here has been the close metering required of the additive and its filtering to prevent clogging of the metering system and spray nozzles which are required. In addition, special considerations are due when the fluid is depleted to counter the vacuum effect on the container for the catalitic fluid and to preclude too great an air draft to the engine system.

SUMMARY OF THE PRESENT INVENTION:

The present invention is directed to a simple vacuum induction system to supply a fuel additive or catalist in a fine mist form to the engine combustion system and in which the reduced pressure condition is used to create the vapor mist that is used and the vapor mist, in turn, is used to cleanse and prevent clogging of the mist flow metering system through which the additive is supplied to an engine.

In practice, a plastic or like two quart or larger container is used for the fluid additive to be vaporized and supplied to an engine. A fresh air intake is provided through a tube that extends well down below the liquid level in the container and the vacuum pressure from the intake system of the engine is applied to the container over the fluid level to induce a down draft of air through the intake tube and a bubbling and filtering of the fresh air through the catalitic fluid. This, in turn, creates a vapor mist, as the bubbles break on the surface, and the mist is metered through a valve assembly in the same induction line that is connected to the engine induction system.

On those cars produced after 1966 and having a positive crankcase ventilation line, to recirculate crankcase fumes back into the intake manifold at the base of the carburetor, the system is ideally connected into it with a venturi wye fitting. However, the connection can be made directly to the base of an engine carburetor or elsewhere in the intake manifold system, as proves most convenient.

The disclosed system depends solely on the vacuum draw of the engine and requires no vacuum boost, as with previous direct vaporized fuel systems.

The vacuum draw on the fluid container used for the additive is so minimal that a plastic container can be used without concern and even if the fluid is depleted, through inattention, the air draw will not shut down the engine.

The bubbling of fresh air through the catalitic fluid keeps it agitated and a constant vapor supply at its surface.

By having the metering valve on the outlet side, for the vapor mist, rather than on the fresh air intake side, the metering valve is kept clean and free from clogging, by the alcohol content of the vapor mist, and close metering control for longer servicable life with a given quality of fluid is obtainable.

These and other advantages will be more apparent in the detailed description which follows a brief description of the drawing figures.

DESCRIPTION OF THE DRAWING FIGURES

DETAILED DESCRIPTION OF ILLUSTRATED EMBODIMENT

The accompanying drawing figures are of a preferred embodiment of the present invention.

A plastic bottle or container 10 of a translucent plastic material is used as a reservoir for the catalitic fluid 12, shown therewithin, and is of a two quart size or larger depending upon available space within the engine compartment, where it is normally mounted, the amount of catalitic fluid desired to be held in reserve, and other considerations.

The container is preferably of a molded plastic with reasonably high heat resistance to withstand any adverse effect due to engine heat generated in the engine compartment where it is mounted and to avoid problems due to breakage otherwise present from being dropped during installation, collision impact, expansion or contraction and the like known with glass and similar containers. The plastic material used is also translucent so that the liquid level in the container is readily visible through its side walls and no other means of measuring the reserve supply of catalitic fluid is necessary.

Figure 1:
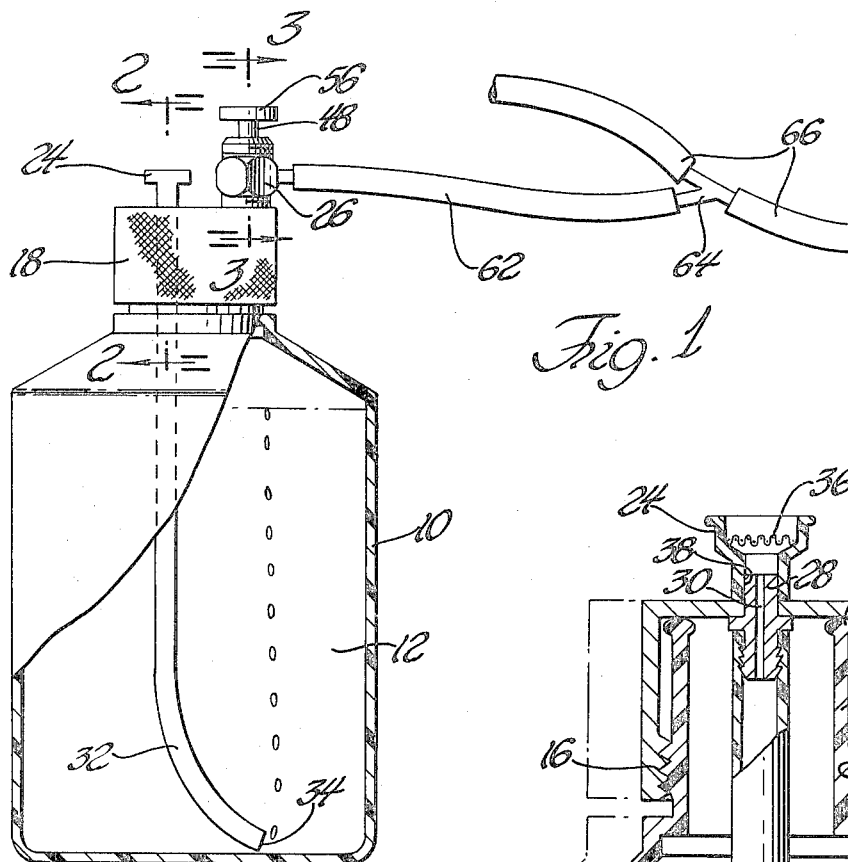
FIG. 1 is a side elevational view of the vapor injector device of the present invention as connected for use into the positive crankcase ventilation line.
Figure 2:
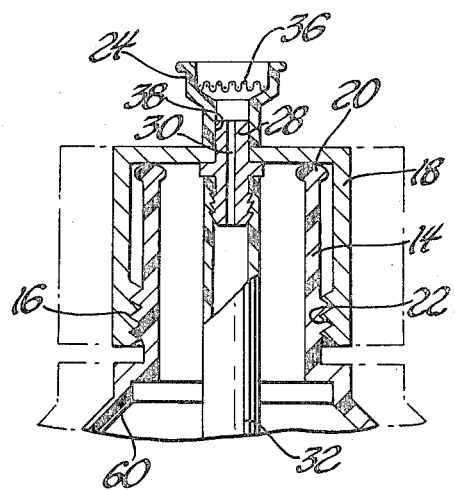
FIG. 2 is an enlarged cross-sectional view taken through the air inlet as seen in the plane of line 2—2 of the first drawing figure, looking in the direction of the arrows, and with the full outline of the bottle and cap shown in phantom therebehind.
Figure 3:
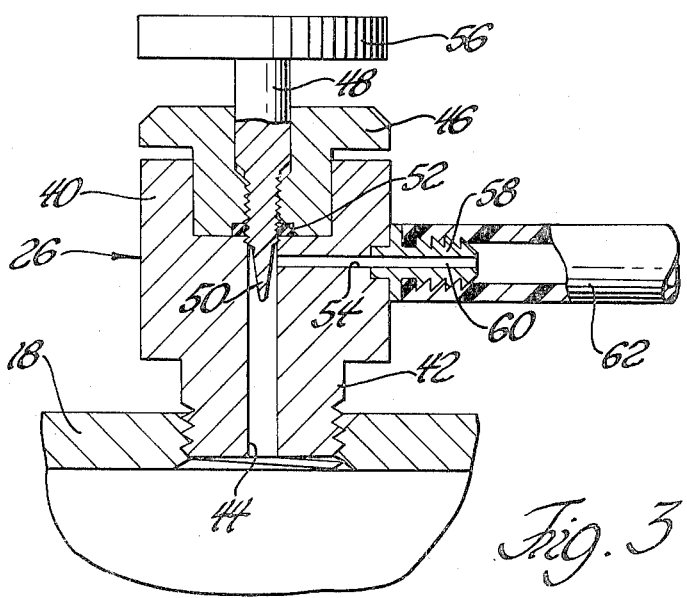
FIG. 3 is a still further enlarged cross-sectional view taken through the vapor control valve, on the outlet side of the bottle, as seen in the plane of line 3—3 in the first drawing figure, looking in the direction of the arrows and with the outlet stem turned 90°.

A neck 14 is formed on the container 10 and is provided with screw threads 16 around its base to receive and retain a closure member or cap 18, as best shown in FIG. 2. The neck on the container is of sufficient height with respect to the depth of the cap to provide an air seal about the rim of the container, as at 20, with the cap screwed down for engagement therebetween.

The closure member or cap 16 is made of aluminum, or other suitable material, with screw threads 22 near its open end and with an air screen fitting 24 and a metering valve assembly 26 provided on and projecting over its closure surface.

The air screen fitting 22 is received on one end of a nipple 28 which is fitted into an opening provided through the closure member and has an air passage 30 provided through it. The other end of the nipple 28 extends sufficiently into the cap to receive and have an air hose 32 engaged to it and the air hose, which is preferably of a neoprene or like plastic material, is of sufficient length to extend down into the container and to be bowed slightly by engagement with the bottom wall of the container and to have its open end 34 exposed sidewardly, as shown in the first drawing figure.

The air screen fitting 22 has a fine air filter screen 36 within it to restrict particle size in the air flow through it to about 0.005 inches and it is of a plastic material, similar to the reservoir container, with a flared opening 38 and sufficiently tight fit on the nipple to retain it in place but also allow its easy removal for cleaning, if and as needed.

The metering valve assembly 26 is shown in considerably enlarged and cross-sectioned detail in the third drawing figure.

The valve assembly includes a three quarter inch hexagonal nut-like body member 40 with a short stem 42 that is threaded into a receptive opening in the closure member. A passageway 44 is provided axially through the body member and a valve stem fitting 46 is press fitted and sealed into the upper end of the body member and is threaded to receive a valve stem member 48 that is axially adjustable therewithin and has a needle nose end 50 extending into the passageway 44.

An O-ring 52 within the end of the valve stem fitting 46 is disposed to seal about the valve stem member 48 and close off the passageway 44 while a cross passage 54 through the body member, near the end of the valve stem disposed therein, is provided to allow metered flow therethrough.

The valve stem member 48 is preferably of a hard durable plastic material for good and reasonably tight thread engagement and with an enlarged head 56 that enables the metering end to be set and retained in a given position within the passage 44 immediately adjacent the cross passage 54.

A nipple member 58 is press fitted into the side wall of the body member 40 and has a through passage 60 aligned with the cross passage 52 and a projecting end upon which is received and retained an air hose 62 that connects to a wye type venturi fitting 64 in the positive crankcase ventilation line 66 to the carburetor or intake manifold system of the engine with which the present invention is used.

OPERATION AND USE

A universal mounting bracket (not shown) is used to mount the reservoir container 10 within a vehicle engine compartment, or any convenient straight or curved surface, and in close proximity to where a suitable connection can be made into the positive crankcase ventilation line, for those cars so equipped, or directly to the carburetor or intake manifold on older and other model cars.

A special monohydric alcohol fluid 10 is used in the container, which is formulated to enhance combustion within an engine and to reduce air pollution from exhaust emissions.

With the vehicle engine running, a vacuum pressure is drawn within the container 10 through the hose connection 62, either from the carburetor or intake manifold, or through the venturi wye fitting 64 in the positive crankcase ventilation line 66, on cars so equipped. This, in turn, induces a filtered fresh air flow, relatively proportionate to the vacuum draw of the engine at varying speeds, which passes through the air filter fitting 24 and the inlet air tube 32 and causes bubbling through the end of the tube up through the fluid in the container.

As the fresh air bubbles up through the fluid in the container, there is a further natural filtering of the air through the fluid and as the bubbles break the surface there is a fine vapor mist created in the top of the container, over the fluid, which is induced through the metering valve assembly 26 into the hose line connection 62 to the engine system.

Although there is a vacuum induced mist flow to the engine, it will be appreciated that there is not a positive vacuum draw on the container in the sense that normally precludes the use of a plastic reservoir container. The draw is through the fluid in the container and the metered flow being on the outlet side of the container, rather than the inlet side, guards against any vacuum collapse or contraction of the container walls.

If through extraordinary circumstances the air filter screen 36 should become clogged in service the whole unit is merely cut-off at the venturi wye connection, with those engines having the positive crankcase ventilation system, and if the fluid level should fall below the end of the bubbler tube 32 there is merely a fresh air draw straight through the container.

In both instances the change in engine performance will make the situation known and enable necessary corrections to be made. The fresh air flow through the container, however, is so slight as to not make the engine inoperative but to merely lean out the fuel-air mixture and reduce efficiency to where it is noticable.

The vapor mist metering valve assembly 26 is wholly contained within the closure cap 18 on the fluid container 10. And the closure cap 18 is such as may be used on different sized fluid containers, with the same size neck 14, for greater production versitility.

The closure cap 18 is capable of being screwed down on the container finger tight to provide the required seal and a 29 inch vacuum, when the vehicle engine is running, to obtain the injection or induction mist flow desired.

The end of the valve stem 48, in the metering valve, is adjusted by means of the knob 56, as necessary for a particular engine, and once set does not require any further adjustment.

Since the container body is translucent, the bubbling action is visible through the side walls and the valve adjustment is merely a matter of turning down or backing off the metering end of the valve stem member to obtain the degree of bubbling, and consequently mist flow that is desirable and most beneficial.

A sufficiently small amount of catalitic fluid is used in the disclosed system, since it is an induced vapor flow, rather than a direct fluid metering system, to enable a two quart container to provide improved performance and operating cost reductions for several thousands of miles and to require replenishment only three or four times a year, depending upon milage usage of the vehicle with which it is used.

The vapor mist provided to an engine by the disclosed system varies only with engine requirements and consequently its full range of benefits as regards fuel economy, reduced exhaust emission polution, plug fouling, etc are available with both city and open road driving.

We claim:

1. A catalitic fluid vapor mist induction system for use with internal combustion engines, and comprising;

a fluid container having a closure member provided thereon and including a fresh air inlet and a vapor mist outlet provided within said closure member, a liquid level of vapor mist fluid provided within said container and an air inlet tube connected to the fresh air inlet and extending below said liquid level, and means connected to said vapor mist outlet and for connection to the induction system of an internal combustion engine for inducing air flow through the fresh air inlet and from the end of said tube beneath said liquid level for bubbling to the surface thereof, and a metering means within said vapor mist outlet for pre-determination of the extend of said bubbling and the vapor mist created thereby for induction to said engine, said fluid container being of a shatter-proof translucent plastic material for enabling relative care-free handling in the refilling thereof and visual inspection of the extent of bubbling occuring therewithin, a filler neck formed on said container centrally disposed and of lesser circumferential size than the fluid retaining portion of said contaier, said container including a relatively domed cover wall between the fluid retaining portion thereof and said filler neck for vapor mist collection and direction towards said filler neck and a return run-off of condensation towards said fluid retaining portion, a sealing bead provided peripherally about said filler neck for sealing engagement with said closure member, and said closure member including a metal closure cap of appropriate size threaded for engagement with said filler neck and for providing sealing engagement between said sealing bead and said cap; said fresh air inlet including an opening provided through the cover wall of said closure cap and a one piece member press fitted and sealed within said cover wall opening and having an air passage provided therethrough, said one piece member being of sufficient length to extend through said cover wall opening on opposite sides thereof for receiving said air inlet tube in self sealing engagement on the inner disposed end thereof and a filter screen member in self-sealing engagement on the outer disposed end thereof, and a filter screen member of such size and material as permits press fitted self-sealing engagement over the outer disposed end of said one piece member and includes a relatively enlarged inlet end having a filter screen therein for the filter screen protection of said air passage and the terminal end protection of the otherwise exposed end of said one piece member through which said air passage extends, said vapor mist outlet including an opening through the cover wall of said closure cap next adjacent and apart from said fresh air inlet opening and threaded to receive a screw machine part in engagement therewithin, a screw machine part threaded for sealing and locking engagement within said outlet opening and having a flow metering orifice provided therewithin, and a barbed hose connection part having a flow passage therethrough for press fitted engagement into said screw machine part and providing outlet communication with the flow metering orifice therewithin and for vapor mist induction by said engine.

2. The vapor mist induction system of claim 1, said screw machine part including a first member having said flow metering orifice provided therewithin, a second member press fitted into engagement with said first member and including a threaded passage in communication with said metering orifice, and a needle valve member within said last mentioned threaded passage for close tolerance vapor mist flow control through said flow metering orifice, and whereby said second member and needle valve member afford a sub-assembly for closer tolerance control than is required of said first screw machine part member.

* * * * *